A. E. BRONSON.
DUST CAP.
APPLICATION FILED NOV. 15, 1917.

1,432,525. Patented Oct. 17, 1922.

Inventor.
Adelbert E. Bronson
by Thurston & Kim
attys

Patented Oct. 17, 1922.

1,432,525

UNITED STATES PATENT OFFICE.

ADELBERT E. BRONSON, OF CLEVELAND, OHIO.

DUST CAP.

Application filed November 15, 1917. Serial No. 202,095.

*To all whom it may concern:*

Be it known that I, ADELBERT E. BRONSON, a citizen of the United States, residing at Cleveland, in the county of Cuyahoga and State of Ohio, have invented a certain new and useful Improvement in Dust Caps, of which the following is a full, clear, and exact description.

This invention relates to a hollow metal article more particularly intended for use as a dust cap, which dust caps are used in connection with valves of pneumatic tires. The object of the invention is to provide a dust cap made of composite metals, which will provide a substantial reduction in the cost of manufacturing these articles.

Generally speaking, the invention may be said to comprise the elements and combinations thereof set forth in the accompanying claims.

Figure 1:
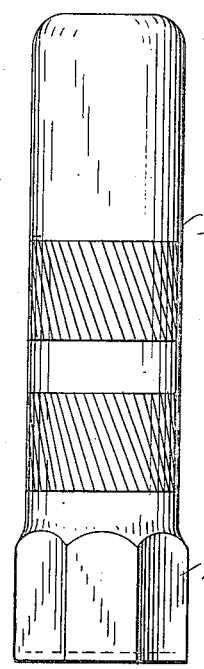
Figure 2:
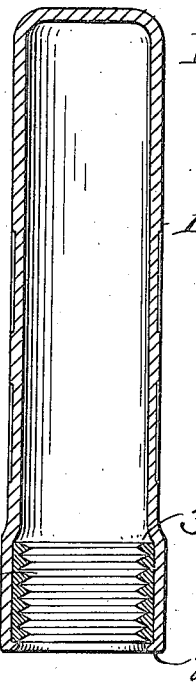
Figure 3:
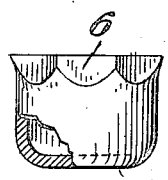
Figure 4:
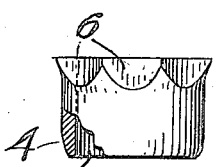
Figure 5:
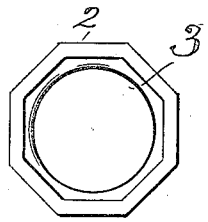
Figure 6:
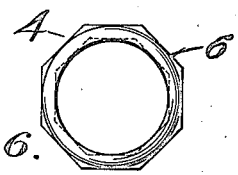

Reference should be had to the accompanying drawings forming a part of this specification in which Fig. 1 is an elevation showing a dust cap embodying my invention; Fig. 2 is a vertical, sectional elevation of a dust cap; Fig. 3 shows an elevation with a portion in section of a blank used in making a dust cap of my invention; Fig. 4 shows an elevation with part in section of the construction shown in Fig. 3; Fig. 5 is a bottom plan view of the showing in Fig. 1; and Fig. 6 is a top plan view of the blanks shown in Figs. 3 and 4.

The invention will be explained as it is carried out with respect to the making of a dust cap for use as a protecting casing in connection with valve stems for pneumatic tires, although by this disclosure I do not wish to limit myself to this precise usage, as it will be obvious that other usages than that specified may be made of the construction involved.

Dust caps and articles of this character are subjected to corroding action of the elements when in use, and because of this fact it has been customary to make dust caps or similar articles of brass because of the non-corroding properties of brass.

However, due to the enormously increased cost of brass, the cost of manufacturing such articles entirely of brass has risen to a point as to make the cost out of proportion to the value of the article, and hence it is my purpose to make a dust cap or similar article of composite metal construction in which certain portions of the article are made of steel which may be nickel-plated or otherwise treated to increase its resistance to the corroding action of mud and water, and to construct certain parts of the article of brass.

Every dust cap involves a portion thereof which is provided with screw threads, which threaded portion is adapted to engage with a threaded part of a valve stem. It is highly desirable that the portion of the dust cap which is provided with screw threads shall be non-corroding in character as otherwise the threaded part would rust, and brass is one of the commoner metals which has this characteristic. Therefore it is my purpose to make that portion of the dust cap which is to be provided with screw threads, of brass, or similar non-corroding material.

Referring to the drawings, the body or shell of the dust cap is indicated at 1, and at its lower portion is provided with a depending skirt portion 2 which is preferably hexagonal in shape. The interior of the shell at the upper part of the skirt portion is provided with a shoulder which is indicated at 3.

In Fig. 3 there is shown a cup shaped member 4, which is formed by pressing metal into the cup shaped form as indicated. In Fig. 4 the same blank is shown in a second step of its formation in which the closed end of the cup shaped portion is pierced or formed with an opening indicated at 5 in Fig. 4.

The wall of the blank 4, adjacent one end thereof is provided with flattened surface portions such as indicated at 6, which correspond with the faces of the depending skirt portion 2 of the shell 1, and where the depending skirt portion is hexagonal shaped, the surfaces 6 will also be hexagonal.

It will be understood that the interior dimension of the skirt portion 2 is such that it will receive the member 4 when prepared as shown in Fig. 4, the fit between the two being, however, a very tight fit and requiring force to push the member 4 within the skirt portion 2.

In introducing the blank 4 into the skirt portion 2 of the shell, the portion thereof which is formed with flattened sides is first introduced, care being taken to see that the sides are in agreement with, and correspond with the sides of the skirt portion 2.

In thus introducing the blank 4 into the skirt portion 2, with the faces 6 in engagement and corresponding with the faces of the skirt portion 2, the blank 4 is prevented from turning relatively to the shell.

When the blank 4 has been introduced within the skirt portion 2, the lower end or edge of the skirt portion is folded against the under side of the blank 4, as indicated at 7 in Fig. 2. This prevents any possibility of the blank 4 being withdrawn from the skirt portion of the shell 1.

After the blank 4 has thus been introduced into the shell, the inner cylindrical surface of the shell is formed with a screw thread, as is clearly seen in Fig. 2.

It will be seen from the description which just precedes, that the shell proper is formed of steel, while within the shell at the lower portion thereof, is a brass member which in effect forms a nut, but the brass member is, by the association with the shell, to all intents and purposes a part thereof. However, inasmuch as the brass portion is the threaded part of the shell, it will not in use become rusted and thereby prevent its successful use.

The shell 1 is preferably formed from sheet metal, being drawn into the desired shape by the use of suitable dies. The brass member 4 is also formed from sheet metal and drawn into the desired shape by the use of suitable dies.

While in practice I prefer to make the shell proper of steel and the blank 4 of brass, it is within the scope of my invention to make the shell 1 of any suitable material and to make the member 4 of suitable non-corroding material.

Having described my invention, what I claim is:

1. As an article of manufacture, an elongated hollow sheet metal member having a skirt portion, a hollow tubular sheet metal shell, having flat faces which meet in edges upon a portion only of the outside surface thereof and being screw threaded upon the inner surface thereof, said shell being forced into tight frictional contact with the inner wall of said skirt portion, the edge of the hollow sheet metal member being crimped against an edge of the shell.

2. As an article of manufacture, an elongated sheet metal member having a skirt portion formed with flat surfaces and being of slightly greater diameter than the remaining portion of the said member, a sheet metal tubular shell having a cylindrical surface except portions thereof which are formed as flat surfaces complementary to the flat surfaces of the said member, the shell being inserted in the skirt portion of the member and being forced into tight frictional contact with the flat surfaces of the skirt portion of the said member, the edge of the said skirt portion being crimped against the shell.

In testimony whereof I hereunto affix my signature.

ADELBERT E. BRONSON.